US012613494B2

(12) United States Patent
Zeng et al.

(10) Patent No.: US 12,613,494 B2
(45) Date of Patent: Apr. 28, 2026

(54) HOLOGRAPHIC DISPLAY SYSTEM AND ELECTRONIC DEVICE

(71) Applicant: SHANGHAI TIANMA MICROELECTRONICS CO., LTD., Shanghai (CN)

(72) Inventors: Yang Zeng, Shanghai (CN); Yaodong Wu, Shanghai (CN)

(73) Assignee: SHANGHAI TIANMA MICROELECTRONICS CO., LTD., Shanghai (CN)

( * ) Notice: Subject to any disclaimer, the term of this patent is extended or adjusted under 35 U.S.C. 154(b) by 135 days.

(21) Appl. No.: 18/655,359

(22) Filed: May 6, 2024

(65) Prior Publication Data

US 2024/0288824 A1 Aug. 29, 2024

(30) Foreign Application Priority Data

Dec. 26, 2023 (CN) .......................... 202311819374.1

(51) Int. Cl.
*G03H 1/02* (2006.01)
*G03H 1/22* (2006.01)

(52) U.S. Cl.
CPC ............. *G03H 1/02* (2013.01); *G03H 1/2249* (2013.01); *G03H 2001/0212* (2013.01);
(Continued)

(58) Field of Classification Search
CPC ............. G02F 1/0136; G02F 1/133512; G02F 1/133514; G02F 1/133528; G02F 1/13363; G02F 1/133638; G02F 1/1337;

G02F 1/1341; G02F 1/134309; G02F 1/13471; G02F 1/137; G02F 1/133354; G02F 1/133633; G02F 1/1347; G02F 2203/12; G02F 1/0102; G02F 1/13; G02F 2201/30;
(Continued)

(56) References Cited

U.S. PATENT DOCUMENTS 11,209,584 B1 * 12/2021 Wu .................... G02F 1/133528
11,281,031 B1 * 3/2022 Sears ......................... G02F 1/01
(Continued)

FOREIGN PATENT DOCUMENTS

CN 115951570 A 4/2023

*Primary Examiner* — Nathnael Aynalem
(74) *Attorney, Agent, or Firm* — KILPATRICK TOWNSEND & STOCKTON LLP

(57) ABSTRACT

A holographic display system and an electronic device are provided. The holographic display system includes: at least a first optical module, a second optical module and a third optical module arranged sequentially in a first direction towards which the backlight is to be emitted. The first optical module is configured to transmit light of a first polarization direction, the second optical module is configured to transmit light of a second polarization direction, and the third optical module is configured to transmit light of a third polarization direction. The first polarization direction and the second polarization direction are at an angle of $\beta_1$, the second polarization direction and the third polarization direction are at an angle of $\beta_2$, and the first polarization direction and the third polarization direction are at an angle of $\beta_3$, $\beta_3$ is greater than at least one of $\beta_1$ and $\beta_2$.

20 Claims, 12 Drawing Sheets

(52) U.S. Cl.
CPC ............... *G03H 2001/0224* (2013.01); *G03H 2001/0228* (2013.01); *G03H 2001/2271* (2013.01); *G03H 2223/20* (2013.01); *G03H 2223/22* (2013.01)

(58) Field of Classification Search
CPC ......... G02F 2201/302; G02F 2201/305; G02F 2203/07; G02F 1/292; G03H 1/2205; G03H 1/2286; G03H 2001/221; G03H 2222/13; G03H 2223/23; G03H 2225/34; G03H 1/02; G03H 1/2294; G03H 2001/0224; G03H 2001/2242; G03H 2223/20; G03H 2223/22; G03H 2001/2234; G03H 1/2249; G03H 2001/0212; G03H 2001/0228; G03H 2001/2271; G03H 2225/33; G03H 2001/2292; G03H 2001/2297; G03H 2225/60; G02B 30/22; G02B 30/33; G02B 30/23; G02B 30/24; G02B 30/25; H04N 13/302
USPC ........................................................... 348/40
See application file for complete search history.

(56)     References Cited

U.S. PATENT DOCUMENTS

2019/0212700 A1 *   7/2019   An ........................... G02B 13/18
2020/0012092 A1 *   1/2020   Song ..................... G03H 1/2286
2021/0200012 A1 *   7/2021   Zeng ....................... G03H 1/02
2023/0258917 A1 *   8/2023   Springer ................ G02B 21/36
                                                                    359/368

* cited by examiner

HOLOGRAPHIC DISPLAY SYSTEM AND ELECTRONIC DEVICE

This application claims priority to Chinese Patent Application No. 202311819374.1, titled "HOLOGRAPHIC DISPLAY SYSTEM AND ELECTRONIC DEVICE", filed on Dec. 26, 2023 with the China National Intellectual Property Administration, which is hereby incorporated by reference in its entirety.

FIELD

The present disclosure relates to the field of holographic displays, and in particular to a holographic display system and an electronic device.

BACKGROUND

In order to meet demands for stereoscopic demonstration by electronic devices, there is a major trend in the field of display towards electronic devices with a 3D display. Electronic devices are integrated a holographic display system to holographically display objects.

The holographic display system is provided with multiple optical modules arranged sequentially. The optical modules each transmits linearly polarized light with the polarization direction remains unchanged. An optical rotator is arranged between two adjacent optical modules that transmit light in different polarization directions. The optical rotator shifts a polarization direction of the light emitted by a first optical module to coincide with a polarization direction of the light emitted by a second optical module. The first optical module is arranged before the second optical module.

In the existing holographic display system, the optical rotator fails to accurately shift the polarization directions of all light waves to coincide with the polarization direction of light emitted by the second optical module. As a result, some light waves are polarized incorrectly, resulting in poor holographic effects.

SUMMARY

In view of this, a holographic display system and an electronic device are provided according to the present application.

In one embodiment, the holographic display system includes:

a backlight module configured to emit backlight;

multiple optical modules arranged at a side of the backlight module where the backlight is to be emitted, where the optical modules comprise at least a first optical module, a second optical module and a third optical module arranged sequentially in a first direction towards which the backlight is to be emitted, the first optical module is configured to transmit light of a first polarization direction, the second optical module is configured to transmit light of a second polarization direction, and the third optical module is configured to transmit light of a third polarization direction, the first polarization direction, the second polarization direction, and the third polarization direction are not parallel to each other; and optical rotators configured to shift the polarization direction, where one of the optical rotators is arranged between the first optical module and the second optical module, the other of the optical rotators is arranged between the second optical module and the third optical module, the first polarization direction and the second polarization direction are at an angle of $\beta_1$, the second polarization direction and the third polarization direction are at an angle of $\beta_2$, and the first polarization direction and the third polarization direction are at an angle of $\beta_3$, wherein $\beta_3$ is greater than at least one of $\beta_1$ and $\beta_2$.

In the other embodiments, an electronic device is provided according to the present application. The electronic device includes a holographic display system. The holographic display system includes:

a backlight module configured to emit backlight;

multiple optical modules arranged at a side of the backlight module where the backlight is to be emitted, where the optical modules comprise at least a first optical module, a second optical module and a third optical module arranged sequentially in a first direction towards which the backlight is to be emitted, the first optical module is configured to transmit light of a first polarization direction, the second optical module is configured to transmit light of a second polarization direction, and the third optical module is configured to transmit light of a third polarization direction, the first polarization direction, the second polarization direction and the third polarization direction are not parallel to each other; and optical rotators configured to shift the polarization direction, where one of the optical rotators is arranged between the first optical module and the second optical module, the other of the optical rotators is arranged between the second optical module and the third optical module, the first polarization direction and the second polarization direction are at an angle of $\beta 1$, the second polarization direction and the third polarization direction are at an angle of $\beta 2$, and the first polarization direction and the third polarization direction are at an angle of $\beta 3$, wherein $\beta 3$ is greater than at least one of $\beta 1$ and $\beta 2$.

It is known from the above description that in the holographic display system and the electronic device according to the embodiments of the present application, three optical modules arranged sequentially in the first direction transmit light waves of the polarization directions having the relationship of $\beta_3 > \beta_1$ and/or $\beta_3 > \beta_2$. That is, at least one of $\beta_1$ and $\beta_2$ is less than $\beta_3$. Based on the requirements of the holographic display system, the optical rotator between the first optical module and the second optical module rotates the polarization of light waves by $\beta_1$ and the optical rotator between the second optical module and the third optical module rotates the polarization of light waves by $\beta_2$.

BRIEF DESCRIPTION OF THE DRAWINGS

The drawings to be used in the description of the embodiments are described briefly as follows, for explaining the embodiments of the present disclosure. It is apparent that the drawings in the following description only illustrate some embodiments of the present disclosure.

Structures, scales, dimensions, and the like as shown in the drawings are drawn in coordination with the content disclosed in the specification, rather than imposing limitations on conditions of implementing embodiments of the present disclosure, and therefore have no substantive significance. Any structural modification, change in proportional relationship, or adjustment in dimensions, when not affecting an effect or a purpose of embodiments of the present disclosure, shall fall within the scope covered by embodiments disclosed herein.

DETAILED DESCRIPTION

The embodiments of the present disclosure are described clearly and completely in conjunction with the drawings hereinafter. It is apparent that the described embodiments are only a few rather than all of the embodiments according to the present disclosure.

As described in the background, the optical rotator fails to accurately rotate the polarization directions of all the light waves to coincide with the polarization direction of light emitted by the second optical module. As a result, some light waves are polarized incorrectly, resulting in poor holographic effects.

Figure 1:
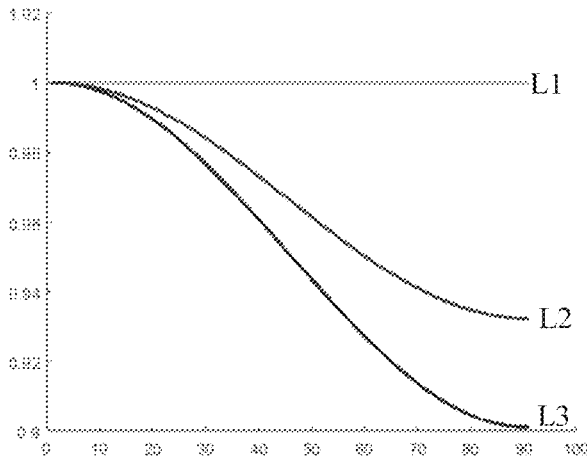
FIG. 1 is a curve chart illustrating proportions of light waves polarized correctly.

Reference is made to FIG. 1, which is a curve chart illustrating polarization directions of light waves rotated by optical rotators. The horizontal axis represents angles by which the optical rotator rotates the polarization direction of light, in units of degrees. The vertical axis represents the proportion of light waves that are polarized by the optical rotator incorrectly.

In FIG. 1, the line L1 shows the relationship between the rotation angle and the proportion of light waves that are polarized by the optical rotator incorrectly for green laser with a wavelength of 532 nm. The curve L2 shows the relationship between the rotation angle and the proportion of light waves that are polarized by the optical rotator incorrectly for red laser with a wavelength of 639 nm. The curve L3 shows the relationship between the rotation angle and the proportion of light waves that are polarized by the optical rotator incorrectly for blue laser with a wavelength of 422 nm. For the green laser, the proportion of light waves that are polarized by the optical rotator incorrectly is 1. However, for the red laser and the blue laser, the proportion of light waves that are correctly by the optical rotator decreases as the rotation angle increases.

Figure 2:
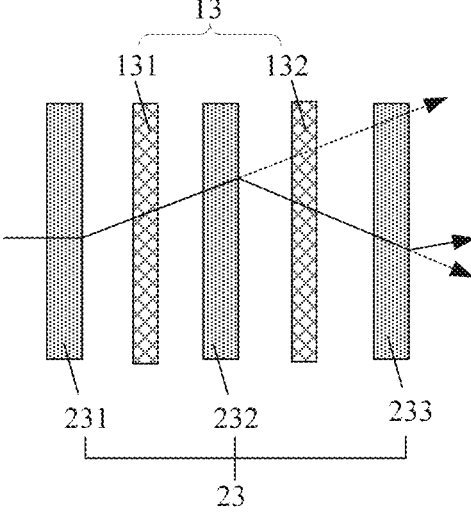
FIG. 2 is a schematic diagram illustrating the interference in stereoscopic representation.

Reference is made to FIG. 2, which is a schematic diagram illustrating a schematic diagram illustrating the interference in stereoscopic representation. For example, three liquid crystal gratings 23 are arranged sequentially, and an optical rotator 13 is arranged between each two adjacent liquid crystal gratings 23. Along a direction in which the light propagates, the three liquid crystal gratings 23 are a first liquid crystal grating 231, a second liquid crystal grating 232 and a third liquid crystal grating 233 sequentially. A first optical rotator 131 is provided between the first liquid crystal grating 231 and the second liquid crystal grating 232. A second optical rotator 132 is provided between the second liquid crystal grating 232 and the third liquid crystal grating 233. In FIG. 2, a solid arrow indicates the direction in which the light wave that is polarized correctly propagates, and a dashed arrow indicates the direction in which the light wave that is polarized incorrectly propagates. The light wave that is polarized incorrectly is interfering light waves, adversely affecting the holographic effects.

Theoretically, if the optical rotator rotates the polarization direction of lasers of different colors correctly to coincide with the alignment direction of the liquid crystal layer in the liquid crystal grating 23, then there are no resultant interfering light waves. However, based on the above analysis in FIG. 1, it can be seen that other two lasers passing through the optical rotator calibrated with one of the red, green, and blue lasers are incorrectly polarized. After passing through the optical rotator, some light waves are incorrectly polarized by the liquid crystal grating 23, and then interfering light waves result. As shown in FIG. 2, after passing through the first optical rotator 131, some light waves are incorrectly polarized. The light waves that are incorrectly polarized fail to correctly propagate after passing through the second liquid crystal grating 232, and then become the interfering light waves. After passing through the second optical rotator 132, some light waves are incorrectly polarized similarly. The light waves that are incorrectly polarized fail to correctly propagate, and then become the interfering light waves.

It is found that the reason for the above problems is that the optical rotator is generally a half-wave plate made of organic material. The organic material includes but is not limited to COP (cyclo olefin polymer), and the optical rotation parameters of the half-wave plate are generally calibrated based on light waves in the same color. For example, a phase difference is calibrated based on a green laser to acquire the optical activity. However, polarization directions of some light waves in the red laser and blue laser, after passing through the half-wave plate, are not rotated correctly.

Based on the relationship between the rotation angle and the proportion of light waves that are correctly polarized, a holographic display system and an electronic device are provided. The holographic system includes: a backlight module, multiple optical modules arranged at a side of the backlight module where the backlight is to be emitted, and optical rotators. The backlight module is configured to emit backlight. The multiple optical modules include at least a first optical module, a second optical module and a third optical module arranged sequentially in a first direction towards which the backlight is to be emitted. The first optical module is configured to transmit light of a first polarization direction. The second optical module is configured to transmit light of a second polarization direction. The third optical module is configured to transmit light of a third polarization direction. The first polarization direction, the second polarization direction, and the third polarization direction are not parallel. One of the optical rotators is arranged between the first optical module and the second optical module, and another of the optical rotators is arranged between the second optical module and the third optical module. The optical rotators are configured to shift the polarization direction. The first polarization direction and the second polarization direction are at an angle of $\beta_1$. The second polarization direction and the third polarization direction are at an angle of $\beta_2$. The first polarization direction and the third polarization direction are at an angle of $\beta_3$, $\beta_3$ is greater than at least one of $\beta_1$ and $\beta_3$.

In the holographic display system according to the embodiments of the present application, three optical modules arranged sequentially in the first direction transmit light waves of the polarization directions having the relationship of $\beta_3 > \beta_1$ and/or $\beta_3 > \beta_2$. That is, at least one of $\beta_1$ and $\beta_2$ is less than $\beta_3$. Based on the requirements of the holographic display system, the optical rotator between the first optical module and the second optical module rotates the polarization of light waves by $\beta_1$, and the optical rotator between the second optical module and the third optical module rotates the polarization of light waves by $\beta_2$. Since at least one of $\beta_1$ and $\beta_2$ is less than $\beta_3$, it is impossible for $\beta_1$ and $\beta_2$ to be greater than $\beta_3$ at the same time. Therefore, the optical rotator polarizes the light waves relatively slightly, and the light waves are less polarized incorrectly, to improve the holographic effects.

The present application is described in further detail in conjunction with the drawings and embodiments hereinafter. Therefore, the above embodiments of the present application are comprehensible.

Figure 3:
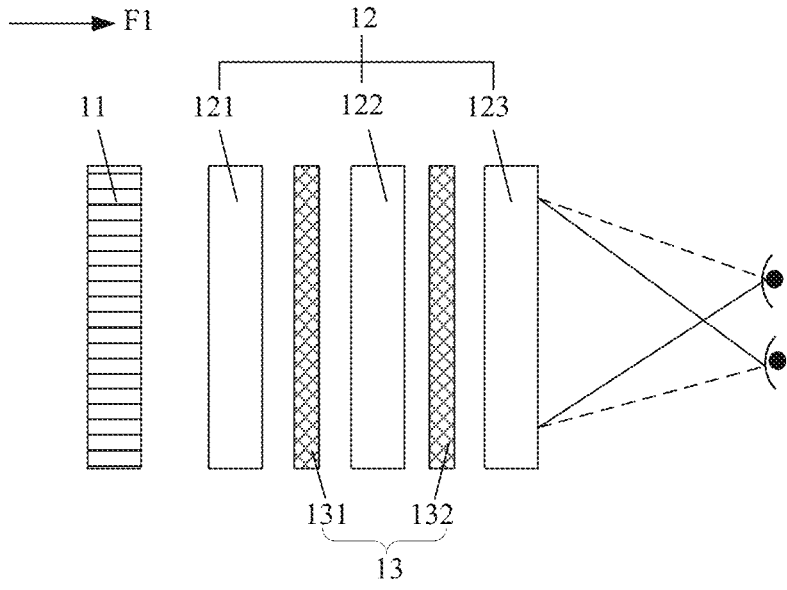
FIG. 3 is a schematic structural diagram illustrating a holographic display system according to an embodiment of the present application.
Figure 4:
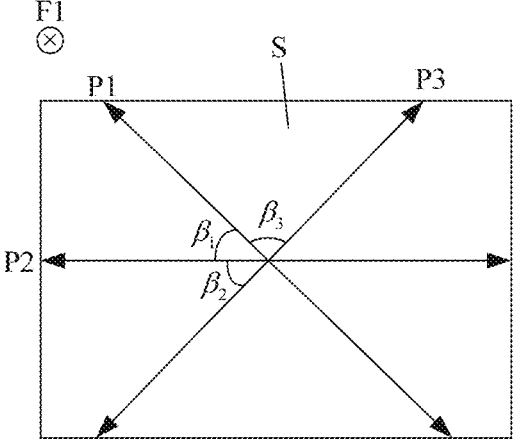
FIG. 4 is a schematic diagram illustrating the relationship among the polarization directions of light eaves passing through the corresponding optical modules in the holographic display system as shown in FIG. 3.

FIG. 3 is a schematic structural diagram illustrating a holographic display system according to the embodiment of the present application. FIG. 4 is a schematic diagram illustrating the relationship the relationship among the polarization directions of light eaves passing through the corresponding optical modules in the holographic display system as shown in FIG. 3. The holographic display system includes: a backlight module 11, multiple optical modules 12 arranged at a side of the backlight module where the backlight is to be emitted, and optical rotators 13. The backlight module 11 is configured to emit backlight. The multiple optical modules 12 include at least a first optical module 121, a second optical module 122 and a third optical module 123 arranged sequentially in a first direction F1 towards which the backlight is to be emitted. The first optical module 121 is configured to transmit light of a first polarization direction P1. The second optical module 122 is configured to transmit light of a second polarization direction P2. The third optical module 123 is configured to transmit light of a third polarization direction P3. The first polarization direction P1, the second polarization direction P2, and the third polarization direction P3 are not parallel. One of the optical rotators 13 is arranged between the first optical module 121 and the second optical module 122, and another of the optical rotators 13 is arranged between the second optical module 122 and the third optical module 123. The optical rotators 13 are configured to shift the polarization direction. The first polarization direction P1 and the second polarization direction P2 are at an angle of $\beta_1$. The second polarization direction P2 and the third polarization direction P3 are at an angle of $\beta_2$. The first polarization direction P1 and the third polarization direction P3 are at an angle of $\beta_3$. $\beta_3$ is greater than at least one of $\beta_1$ and $\beta_3$.

It should be noted that $\beta_1$, $\beta_2$ and $\beta_3$ each are an included angle between two straight lines and therefore not greater than 90°. Since $\beta_3$ is greater than at least one of $\beta_1$ and $\beta_2$, $\beta_1$, $\beta_2$ and $\beta_3$ not equal. That is, at most two of $\beta_1$, $\beta_2$ and $\beta_3$ are equal.

FIG. 4 is a top view of the polarization directions of light waves that the first optical module 121, the second optical module 122 and the third optical module 123 transmit respectively, in a reference plane S. The reference plane S is perpendicular to the first direction F1.

Based on the requirements of the holographic display system, for two adjacent optical modules 12 transmitting light of different polarization directions, the polarization direction of the light emitted from one optical module 12 is rotated by the optical rotator 13 to coincide with the polarization direction of light that the adjacent optical module 12 transmits. That is, the polarization direction of light emitted from the first optical module 121 is rotated two times before the light passing through the third optical module 123. In one embodiment, the optical rotator 13 between the first optical module 121 and the second optical module 122 is a first optical rotator 131. The polarization direction of the light is rotated for the first time by the first optical rotator 131. The optical rotator 13 between the second optical module 122 and the third optical module 123 is a second optical rotator 132. The polarization direction of the light is rotated for the second time by the second optical rotator 132. After the first rotation, the polarization direction of the light from the first optical module 121 is rotated from the first polarization direction P1 to the second polarization direction P2, and then the light passes through the second optical module 122. The polarization direction of the light is rotated by $\beta_1$ in the first rotation. After the second rotation, the polarization direction of the light from the second optical module 122 is rotated from the second polarization direction P2 to the third polarization direction P3, and then the light passes through the third optical module 123. The polarization direction of the light is rotated by $\beta_2$.

Since $\beta_3$ is greater than at least one of $\beta_1$ and $\beta_2$, it is impossible for $\beta_1$ and $\beta_2$ to be greater than $\beta_3$ at the same time. Therefore, the optical rotator rotates the polarization direction of the light relatively slightly, and then the light waves are less polarized incorrectly, to improve the holographic effects.

In one embodiment, both $\beta_1$ and $\beta_2$ are less than 50°. Combined with the above description of FIG. 1, it can be seen that the rotation angle is related to the proportion of light waves that are correctly polarized. The larger the rotation angle is, the smaller the proportion of the light waves that are correctly polarized is. In order to increase the proportion of light waves that are correctly polarized, both $\beta_1$ and $\beta_2$ are less than 50°.

For representation by the holographic display system, the backlight module 11 emits a red laser, a green laser and a blue laser sequentially. Therefore, in the embodiments of the present application, the backlight includes the red laser, the green laser and the blue laser emitted sequentially. The optical rotator 13 is configured to delay a phase of an ordinary wave and a phase of an extortionary wave in the green laser by half a wave. The wavelength of the green laser is 532 nm. Since the human eye is more sensitive to the green laser, the optical rotator 13 is calibrated with green laser as a reference in the embodiments of the present application. As shown in FIG. 1, the proportion of light waves that are correctly polarized in the green laser accounts for 100% at any rotation angle.

TABLE 1

| Interfering waves in total | Conventional technology | The present application |
|---|---|---|
| B 442 nm | 14.83% | 9.88% |
| G 532 nm | 0 | 0 |
| R 639 nm | 10.14% | 6.76% |

As shown in Table 1 above, the optical rotator 13 being a single half-wave plate is taken as an example. The half-wave plate is configured to delay a phase of an ordinary wave and a phase of an extortionary wave in the green laser by half a wave. For the data in the second to fourth rows in the Table 1, the first column lists the blue laser B with a wavelength of 422 nm, the green laser G with a wavelength of 532 nm, and the red laser R with a wavelength of 639 nm. The second column lists the total interfering waves in the blue laser B accounts for 14.83%, the total interfering waves in the green laser G accounts for 0, and the total interfering waves in the red laser R accounts for 10.14%, for the existing holographic display system. The third column lists the total interfering waves in the blue laser B accounts for 9.88%, the total interfering waves in the green laser G accounts for 0, and the total interfering waves in the red laser R accounts for 6.76%, for the holographic display system according to the embodiments of the present application. Combined with the above description of FIG. 2, it can be seen that the light waves that are incorrectly polarized are the interfering waves. In view of this, the total interfering waves in Table 1 represent the proportion of light waves that are incorrectly polarized after passing through all the optical rotators 13 in the holographic display system.

According to the data in Table 1, the three optical modules 12 arranged sequentially transmit light of the respective polarization directions. Therefore, the proportion of interfering waves in the blue laser is reduced from 14.83% to 9.88%, and the proportion of interfering waves in the red laser is reduced from 10.14% to 6.76%, to improve the homographic effects significantly.

In one embodiment of the present application, as shown in FIG. 4, the rotation angles have a relationship of $(\beta_3-\beta_1)$ $(\beta_3-\beta_2)>0$, that is, $\beta_3$ is greater than both of $\beta_1$ and $\beta_2$. In this case, the first optical rotator 131 rotates the polarization direction of light by $\beta_1$, and the second optical rotator 132 rotates the polarization direction of light by $\beta_2$. Both $\beta_1$ and $\beta_2$ are less than $\beta_3$. That is, the two rotation angles of the polarization direction are the smallest one and the middle one in $\beta_1$, $\beta_2$ and $\beta_3$, instead of $\beta_3$ that is the largest. Therefore, the optical rotator 13 rotates the polarization direction slightly, the proportion of light waves that are correctly polarized emitted from the optical rotator 13 is increased, to improve the holographic effects.

In case of $(\beta_3-\beta_1)(\beta_3-\beta_2)>0$ and $\beta_1 \neq \beta_2$, there is $\beta_3>\beta_1>\beta_2$ or $\beta_3>\beta_2>\beta_1$.

In case of $\beta_3>\beta_1>\beta_2$, the polarization direction of light is rotated for the first time by the first optical rotator 131 by $\beta_1$, which is the middle one in $\beta_1$, $\beta_2$ and $\beta_3$. The polarization direction of light is rotated for the second time by the second optical rotator 132 by $\beta_2$, which is the smallest one in $\beta_1$, $\beta_2$ and $\beta_3$. In this case, the two rotation angles of the polarization direction are the smallest one and the middle one in $\beta_1$, $\beta_2$ and $\beta_3$ similarly, instead of $\beta_3$ that is the largest. Therefore, the proportion of light waves that are correctly polarized is increased to a greatest extent, to improve the holographic effects.

In case of $\beta_3>\beta_2>\beta_1$, the polarization direction of light is rotated for the first time by the first optical rotator 131 by $\beta_1$, which is the smallest in $\beta_1$, $\beta_2$ and $\beta_3$. The polarization direction of light is rotated for the second time by the second optical rotator 132 by$fl_2$, which is the middle one in $\beta_1$, $\beta_2$ and $\beta_3$. In this case, the two rotation angles of the polarization direction are the smallest one and the middle one in $\beta_1$, $\beta_2$ and $\beta_3$ similarly, instead of $\beta_3$ that is the largest. Therefore, the proportion of light waves that are correctly polarized is increased to a greatest extent, to improve the holographic effects.

In case of $(\beta_3-\beta_1)(\beta_3-\beta_2)>0$ and $\beta_1=\beta_2$, there is $\beta_1=\beta_2<\beta_3$.

In case of $\beta_1=\beta_2<\beta_3$, the polarization direction of light is rotated for the first time by the first optical rotator 131 by $\beta_1$, which is the smallest in $\beta_1$, $\beta_2$ and $\beta_3$. The polarization direction of light is rotated for the second time by the second optical rotator 132 by $\beta_2$, which is also the smallest in $\beta_1$, $\beta_2$ and $\beta_3$. In this case, the two rotation angles of the polarization direction each are the smallest one in $\beta_1$, $\beta_2$ and $\beta_3$. That is, the optical rotators 13 rotate the polarization direction of light by small angles. Therefore, the proportion of light waves that are incorrectly polarized is reduced.

In case of $(\beta_3-\beta_1)(\beta_3-\beta_2)>0$, $\beta_3$ may be set to a sum of $\beta_p$ and $\beta_2$. In this case, $\beta_3$ is the largest in $\beta_1$, $\beta_2$ and $\beta_3$ and is equal to the sum of $\beta_1$ and $\beta_2$. The polarization direction of light, when traveling from the first optical module 121 to the third optical module 123, is rotated by $\beta_1$ and $\beta_2$ sequentially, which are smaller compared with $\beta_3$. Therefore, the proportion of light waves that are incorrectly polarized emitted from each optical rotator 13 is relatively small. Further, the sum of the two rotation angles is relatively small, and therefore the proportion of light waves that are incorrectly polarized in the entire system is relatively small.

It should be noted that in case of $(\beta_3-\beta_1)(\beta_3-\beta_2)>0$, the first polarization direction P1, the second polarization direction P2 and the third polarization direction P3 have the relationship of one or two of $\beta_1=\beta_2$ and $\beta_3=\beta_1+\beta_2$.

In case of $(\beta_3-\beta_1)(\beta_3-\beta_2)>0$, the sum of $\beta_1$, $\beta_2$ and $\beta_3$ is 180°, as shown in FIG. 4. In this case, $\beta_1$ is equal or unequal to $\beta_2$.

Figure 5:
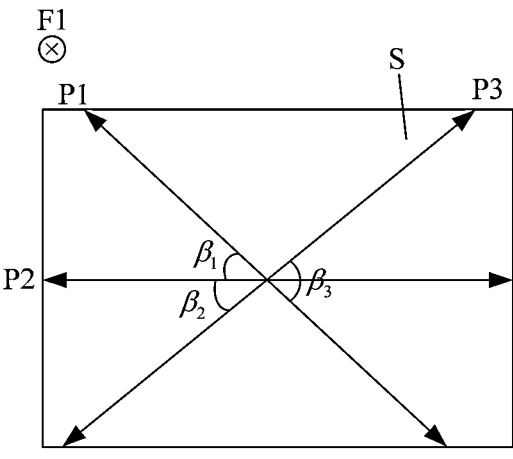
FIG. 5 is a schematic diagram illustrating the relationship among the polarization directions of light waves that passes through the corresponding optical modules in the holographic display system according to an embodiment of the present application.

Reference is made to FIG. 5, which is a schematic diagram illustrating the relationship among the polarization directions of light waves that pass through the corresponding optical modules in the holographic display system according to an embodiment of the present application. The difference from FIG. 4 is in that $\beta_3$ is a sum of $\beta_1$ and $\beta_2$ in case of $(\beta_3-\beta_1)(\beta_3-\beta_2)>0$. In this case, $\beta_1$ is equal or unequal to $\beta_2$.

As mentioned above, $\beta_1$, $\beta_2$ and $\beta_3$ each are an included angle between two straight lines and therefore not greater than 90°. Further, since $\beta_1$, $\beta_2$ and $\beta_3$ are not equal, $\beta_3$ is equal to 90° at best. As shown in FIG. 5, in case of $(\beta_3-\beta_1)(\beta_3-\beta_2)>0$ and $\beta_3=\beta_1+\beta_2$, the angle of $\beta_3$ that is measured in degrees is divided into two smaller angles, that is, $\beta_1$ and $\beta_2$. In this way, the polarization direction of light, travels from the first optical module 121 to the third optical module 123, is relatively slightly rotated twice. Therefore, the proportion of light waves that are correctly polarized emitted by the optical rotators 13 is increased, and then the holographic effects can be improved.

In case of $(\beta_3-\beta_1)(\beta_3-\beta_2)>0$ and $\beta_3\beta_1+\beta_2$, $\beta_1$ is equal to $\beta_2$. In this case, the polarization direction of the light, when traveling from the first optical module 121 to the third optical module 123, is rotated by $\beta_1$ and $\beta_2$ sequentially, which are equal and less than $\beta_3$. The proportion of light waves that are incorrectly polarized emitted from each optical rotator 13 is relatively small. Further, the sum of the two rotation angles is relatively small and therefore the proportion of light waves that are incorrectly polarized in the entire system is relatively small. In another case, $\beta_1$ is unequal to $\beta_2$. The polarization direction of the light, when traveling from the first optical module 121 to the third optical module 123, is rotated by $\beta_1$ and $\beta_2$ sequentially, which are equal and less than $\beta_3$. Similarly, the proportion of light waves that are incorrectly polarized emitted from each optical rotator 13 is relatively small. Further, the sum of the two rotation angles is relatively small and therefore the proportion of light waves that are incorrectly polarized in the entire system is relatively small.

Figure 6:
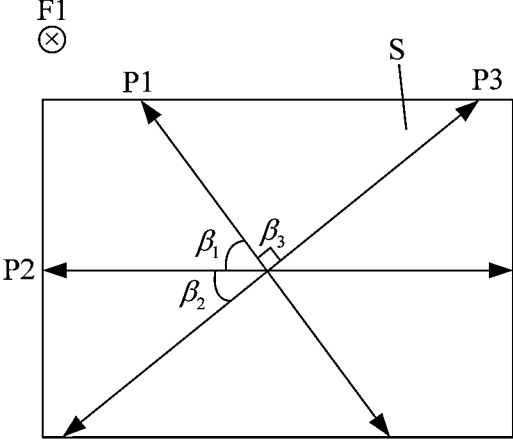
FIG. 6 is a schematic diagram illustrating another relationship among the polarization directions of light that passes through the corresponding optical modules in the holographic display system according to an embodiment of the present application.

Reference is made to FIG. 6, which is schematic diagram illustrating another relationship among the polarization directions of light that pass through the corresponding optical modules in the holographic display system according to an embodiment of the present application. In this embodiment, $\beta_3$ is equal to 90°, and $\beta_1$ is equal or unequal to $\beta_2$. In case of $\beta_3$ is equal to 90°, there is a sum of $\beta_1$ and $\beta_2$ equal to 90°. That is, $\beta_3$ is equal to a sum of pi and $\beta_2$, and a sum of $\beta_1$, $\beta_2$ and $\beta_3$ is equal to 180°. This is because that there is $\beta_1+\beta_2=90°$ in case of $(\beta_3-\beta_1)(\beta_3-\beta_2)>0$, $\beta_3=900$ and $\beta_1+\beta_2+\beta_3=180°$. There is also $\beta_1+\beta_2=90°$ in case of $\beta_3=\beta_1+\beta_2$. That is, there is $\beta_1+\beta_2=90°$ in case of $(\beta_3-\beta_1)(\beta_3-\beta_2)>0$, $\beta_3=90°$ and $\beta_1+\beta_2+\beta_3=180°$, and further $\beta_3=90°$ and $\beta_1+\beta_2+\beta_3=180°$. In this case, both $\beta_1$ and $\beta_2$ are less than 90°, and the sum of $\beta_1$ and $\beta_2$ is not greater than 90°. In this way, the polarization direction of the light, when travelling from the first optical module 121 to the third optical module 123, is rotated by angles each less than 90°. Further, the sum of the two rotation angles is also relatively small and therefore the proportion of light waves that are incorrectly polarized in the system is relatively small.

In the embodiment shown in FIG. 6, $\beta_3$ is equal to 90°. That is, the first polarization direction P1 is perpendicular to the third polarization direction P3, facilitating the arrangement of the first optical module 121, the second optical module 122 and the third optical module 123 in the holographic display system. The first optical module 121 and the third optical module 123 are such arranged that the first polarization direction P1 is perpendicular to the third polarization direction P3 while the three optical modules are arranged in parallel. Therefore, there is $\beta_3=90°$ and $\beta_1+\beta_2=90°$. Even though the second optical module 122 is placed randomly between the first optical module 121 and the third optical module 123, $\beta_3$ is greater than at least one of $\beta_1$ and $\beta_2$.

In some embodiments of the present application, there is $(\beta_3-\beta_1)(\beta_3-\beta_2)<0$. In this case, one of $\beta_1$ and $\beta_2$ is less than $\beta_3$ and the other of $\beta_1$ and $\beta_2$ is greater than $\beta_3$. In this way, one of the first optical rotator 131 and the second optical rotator 132 rotates the polarization direction of the light, when traveling from the first optical module 121 to the third optical module 123, by a relatively small angle less than $\beta_3$. Therefore, the proportion of light waves that are correctly polarized can be improved, to improve the holographic effects.

In case of $(\beta_3-\beta_1)(\beta_3-\beta_2)<0$, one of $\beta_1$ and $\beta_2$ is less than $\beta_3$ and the other of $\beta_1$ and $\beta_2$ is greater than $\beta_3$. This includes two cases of $\beta_2>\beta_3>\beta_1$ and $\beta_1>\beta_3>\beta_2$.

Figure 7:
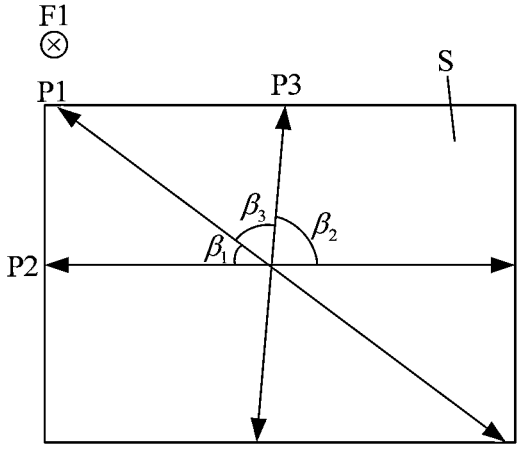
FIG. 7 is a schematic diagram illustrating another relationship among the polarization directions of light that passes through the corresponding optical modules in the holographic display system according to an embodiment of the present application.

Reference is made to FIG. 7, which is a schematic diagram illustrating another relationship among the polarization directions of light that passes through the corresponding optical modules in the holographic display system according to an embodiment of the present application. FIG. 7 illustrates an embodiment in case of $\beta_1+\beta_2+\beta_3=180°$ and $\beta_2>\beta_3>\beta_1$.

Figure 8:
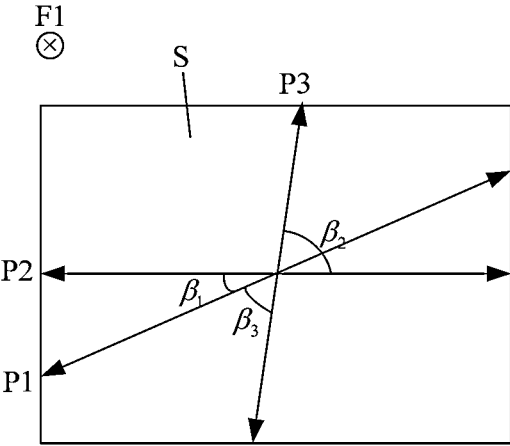
FIG. 8 is a schematic diagram illustrating another relationship among the polarization directions of light that passes through the corresponding optical modules in the holographic display system according to an embodiment of the present application.

FIG. 8 illustrates another embodiment in case of $\beta_2>\beta_3>\beta_1$.

Reference is made to FIG. 8, which is a schematic diagram illustrating another relationship among the polarization directions of light that passes through the corresponding optical modules in the holographic display system according to an embodiment of the present application. In this embodiment, there is $\beta_2>\beta_3>\beta_1$. The first polarization direction P1 divides $\beta_2$ into two different angles $\beta_3$ and $\beta_1$, where $\beta_3$ is greater than $\beta_1$. FIG. 8 illustrates the embodiment in case of $\beta_1+\beta_3=1\beta_2$ and $\beta_2>\beta_3>\beta_1$.

There is definitely $\beta_2>\beta_3>\beta_1$ in case of $(\beta_3-\beta_1)(\beta_3-\beta_2)<0$ and $\beta_1+\beta_3=1\beta_2$. In this case, the polarization direction of the light, when travelling from the first optical module 121 to the third optical module 123, is rotated for the first time by $\beta_1$ that is the smallest, and is rotated for the second time by $\beta_2$ that is the largest, instead of being rotated twice by larger two of $\beta_1$, $\beta_2$ and $\beta_3$. Therefore, the proportion of light waves that are correctly polarized in the system can be increased to a given extent, and then the holographic effects can be improved.

Figure 9:
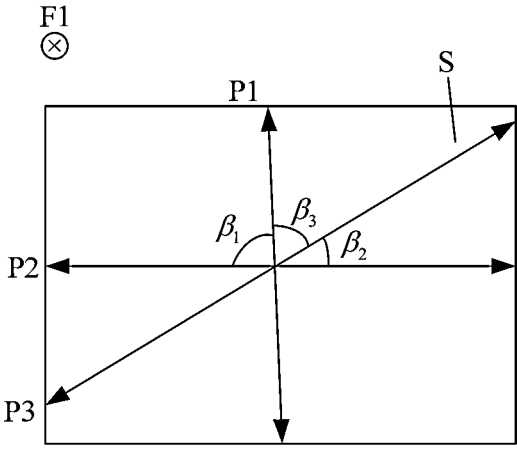
FIG. 9 is a schematic diagram illustrating another relationship among the polarization directions of light that pass through the corresponding optical modules in the holographic display system according to an embodiment of the present application.

Reference is made to FIG. 9, which is a schematic diagram illustrating another relationship among the polarization directions of light that pass through the corresponding optical modules in the holographic display system according to an embodiment of the present application. In this embodiment, there is $\beta_1>\beta_3>\beta_2$. FIG. 9 illustrates the embodiment in case of $\beta_1+\beta_2+\beta_3=180°$ and $\beta_1>\beta_3>\beta_2$.

Figure 10:
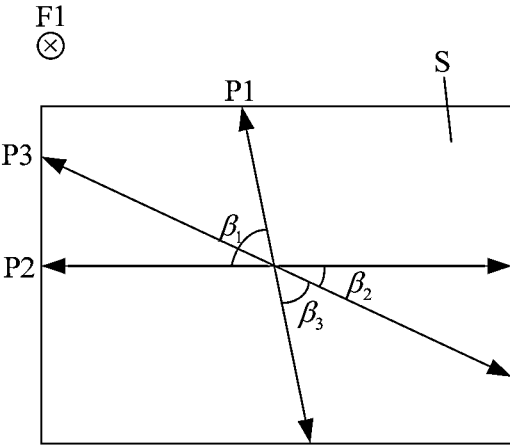
FIG. 10 is a schematic diagram illustrating another relationship among the polarization directions of light that pass through the corresponding optical modules in the holographic display system according to an embodiment of the present application.

FIG. 10 illustrates another embodiment in case of $\beta_1>\beta_3>\beta_2$.

Reference is made to FIG. 10, which is a schematic diagram illustrating another relationship among the polarization directions of light that pass through the corresponding optical modules in the holographic display system according to an embodiment of the present application. In this embodiment, there is $\beta_1>\beta_3>\beta_2$. The third polarization direction P3 divides $\beta_1$ into two different angles $\beta_3$ and $\beta_2$, where $\beta_3$ is greater than $\beta_2$. FIG. 10 illustrates the embodiment in case of $\beta_1+\beta_3=1\beta_2$ and $\beta_1>\beta_3>\beta_2$.

Throughout the embodiments as shown in FIG. 7 to FIG. 10, there is $(\beta_3-\beta_1)(\beta_3-\beta_2)<0$. In this way, one of the first optical rotator 131 and the second optical rotator 132 rotates the polarization direction of the light, when traveling from the first optical module 121 to the third optical module 123, by a relatively small angle less than $\beta_3$. Therefore, the proportion of light waves that are correctly polarized can be improved, to improve the holographic effects. Further, as mentioned above, the polarization direction of the light, when travelling from the first optical module 121 to the third optical module 123, is rotated for the first time by $\beta_1$ and is rotated for the second time by $\beta_2$, where one of $\beta_2$ and $\beta_1$ is less than $\beta_2$ and $\beta_3$, instead of being rotated twice by larger two of $\beta_1$, $\beta_2$ and $\beta_3$. Therefore, the proportion of light waves that are correctly polarized in the system can be increased to a given extent, and then the holographic effects can be improved.

In other embodiments of the present disclosure, there is $(\beta_3-\beta_1)(\beta_3-\beta_2)=0$. In case of $\beta_3>\beta_1$ or $\beta_3>\beta_2$, one of $\beta_1$ and $\beta_2$ is less than $\beta_3$ and the other is equal to $\beta_3$. In this way, one of the first optical rotator 131 and the second optical rotator 132 rotates the polarization direction of the light, when traveling from the first optical module 121 to the third optical module 123, by a relatively small angle less than $\beta_3$. Therefore, the proportion of light waves that are correctly polarized can be improved, to improve the holographic effects.

In case of $(\beta_3-\beta_1)(\beta_3-\beta_2)=0$, one of $\beta_1$ and $\beta_2$ is less than $\beta_3$ and the other of $\beta_1$ and $\beta_2$ is equal to $\beta_3$. This includes two cases of $\beta_2=\beta_3>\beta_1$ and $\beta_1=\beta_3>\beta_2$.

Figure 11:
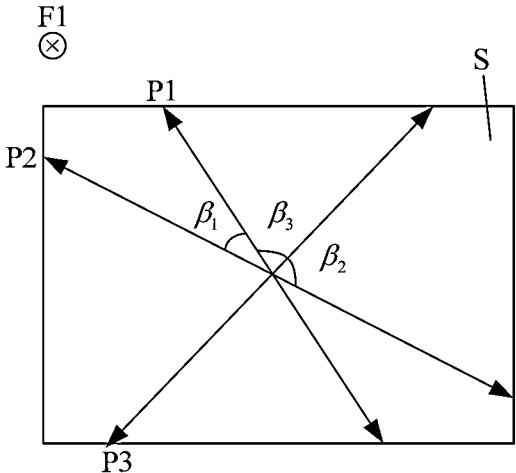
FIG. 11 is a schematic diagram illustrating another relationship among the polarization directions of light that pass through the corresponding optical modules in the holographic display system according to an embodiment of the present application.

Reference is made to FIG. 11, which is a schematic diagram illustrating another relationship among the polarization directions of light that passes through the corresponding optical modules in the holographic display system according to an embodiment of the present application. FIG. 11 illustrates the embodiment in case of $\beta_2=\beta_3>\beta_1$.

Figure 12:
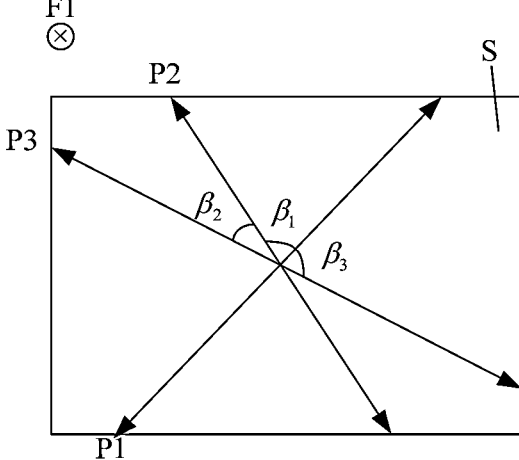
FIG. 12 is a schematic diagram illustrating another relationship among the polarization directions of light that pass through the corresponding optical modules in the holographic display system according to an embodiment of the present application.

Reference is made to FIG. 12, which is a schematic diagram illustrating another relationship among the polarization directions of light that passes through the corresponding optical modules in the holographic display system according to an embodiment of the present application. FIG. 12 illustrates the embodiment in case of $\beta_1=\beta_3>\beta_2$.

Throughout the embodiments as shown in FIG. 11 and FIG. 12, there is $(\beta_3-\beta_1)(\beta_3-\beta_2)=0$. In this way, one of the first optical rotator 131 and the second optical rotator 132 rotates the polarization direction of the light, when traveling from the first optical module 121 to the third optical module 123, by a relatively small angle less than $\beta_3$. Therefore, the proportion of light waves that are correctly polarized can be improved, to improve the holographic effects.

Figure 13:
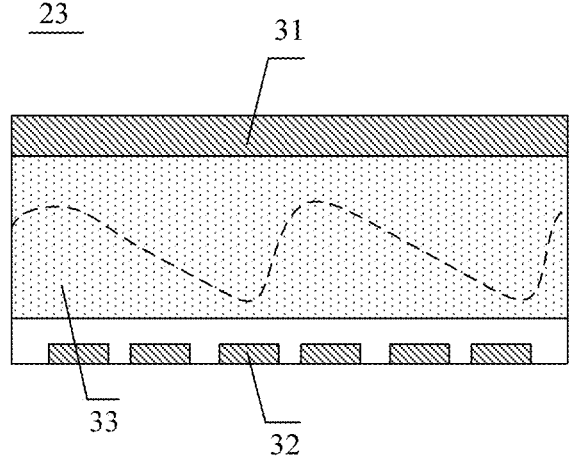
FIG. 13 is a cross-sectional view of a liquid crystal grating according to an embodiment of the present application.

Reference is made to FIG. 13, which is a cross-sectional view of a liquid crystal grating according to an embodiment of the present application. The liquid crystal grating includes: a first control electrode 31 and a second control electrode 32 and a liquid crystal layer 33. The first control electrode 31 is opposite the second control electrode 32. The first control electrode 31 is a transparent electrode layer and is integrally formed. The second control electrode 32 includes multiple strip-shaped electrodes arranged in parallel. The liquid crystal layer 33 is arranged between the first control electrode 31 and the second control electrode 32. Alignment layers are arranged between the first control electrode 31 and the liquid crystal layer 33, and the second control electrode 32 and the liquid crystal layer 33. An alignment direction of the liquid crystal layer 33 is controlled based on the alignment direction of the alignment layer. In the liquid crystal grating 23, the alignment directions of the two opposite alignment layers arranged are parallel.

In the liquid crystal grating 23, by controlling the voltage of the strip-shaped electrode, the refractive index of the liquid crystal layer 33 changes periodically as illustrated by the dashed curve in FIG. 13. The refractive index of the liquid crystal layer 33 has multiple maximums and minimums alternately arranged as the strip-shaped electrodes extend. The refractive index between a maximum and an adjacent minimum changes continuously. If the alignment direction of the liquid crystal layer 33 is parallel to the polarization direction of the incident light, the light is deflected. If the alignment direction of the liquid crystal layer 33 is perpendicular to the polarization direction of the incident light, the propagation direction of the light remains unchanged.

Figure 14:
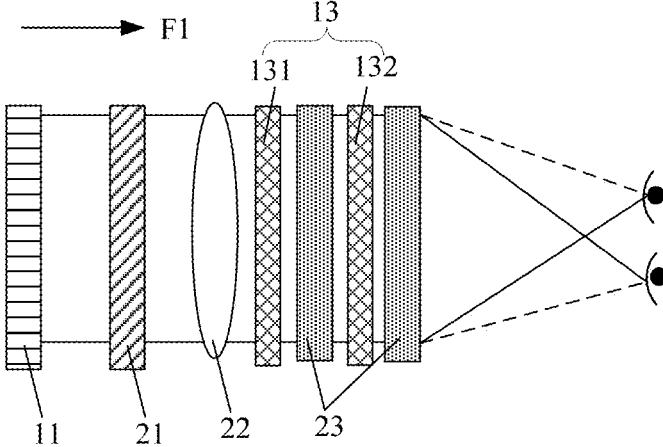
FIG. 14 is a schematic structural diagram illustrating the holographic display system according to another embodiment of the present application.

Reference is made to FIG. 14, which is a schematic structural diagram of the holographic display system according to another embodiment of the present application. The multiple optical modules 12 include a spatial light modulator 21 and at least two liquid crystal gratings 23 arranged sequentially along the first direction F1. The spatial light modulator 21 is configured to modulate the phase and the amplitude of the backlight emitted from the backlight module 11.

In one embodiment, a field lens 22 is provided between the spatial light modulator 21 and the at least two liquid crystal gratings 23. The field lens 22 is configured to improve transmission of light emitted from the spatial light modulator 21 to the adjacent liquid crystal grating 23.

It should be noted that, in the embodiments of the present application, the optical module 12 is an optical device with polarization properties, adjusts the linearly polarized light and outputs the adjusted linearly polarized light. The first optical module 121, the second optical module 122 and the third optical module 123 arranged sequentially along the first direction F1 are three liquid crystal gratings 23 arranged. In one embodiment, the first optical module 121, the second optical module 122 and the third optical module 123 arranged sequentially along the first direction F1 are one spatial light modulator 21 and two liquid crystal gratings 23 arranged next to the spatial light modulator 21. The field lens 22 is an optical device without the polarization properties, and therefore transmit light waves in various polarization directions.

For the embodiment shown in FIG. 14, since the polarization direction of the light emitted by spatial light modulator 21 is different from the alignment direction of the liquid crystal layer in the adjacent liquid crystal grating 23, an optical rotator 13 is arranged between the spatial optical modulator 21 and the liquid crystal grating 23. When a field lens 22 is arranged, the optical rotator is arranged between the spatial light modulator 21 and the field lens 22, or between the field lens 22 and the liquid crystal grating 23. At the side of the spatial light modulator 21 where the backlight is emitted, at least two liquid crystal gratings 23 are arranged. An optical rotator 13 is arranged between the two adjacent liquid crystal gratings 23.

In one embodiment of the present application, the first optical module 121 is a spatial light modulator 21.

Figure 15:
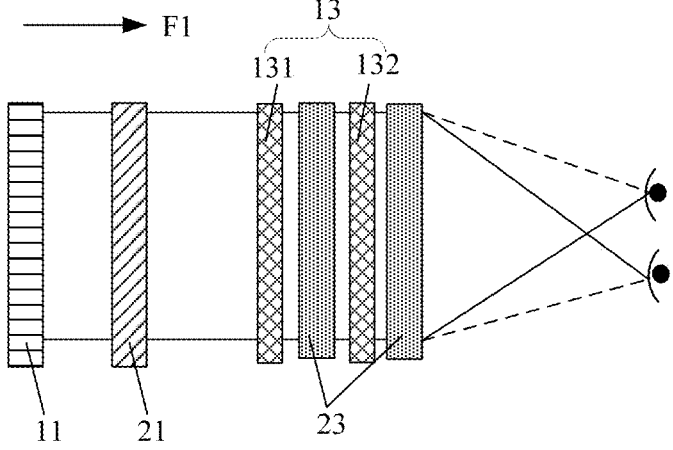
FIG. 15 is a schematic structural diagram illustrating the holographic display system according to another embodiment of the present application.

Reference is made to FIG. 15, which is a schematic structural diagram illustrating the holographic display system according to another embodiment of the present application. The first optical module 121 is the spatial light modulator 21, and no field lens 22 is arranged at the side of the spatial light modulator 21 where the backlight is emitted. The light from the spatial light modulator 21 is incident on the adjacent liquid crystal grating 23 after passing through the first optical rotator 131.

Figure 16:
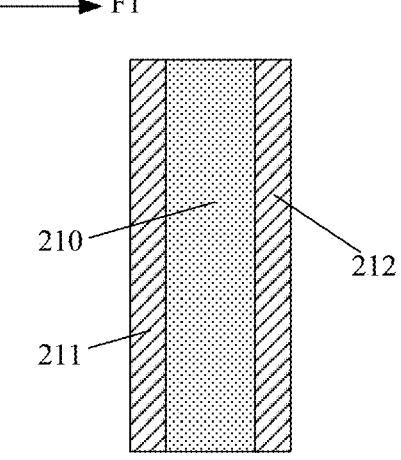
FIG. 16 is a schematic structural diagram illustrating a spatial light modulator according to an embodiment of the present application.

FIG. 16 is a schematic structural diagram illustrating a spatial light modulator according to an embodiment of the present application. The spatial light modulator 21 includes a first polarizer 211, a liquid crystal light valve 210 and a second polarizer 212 arranged sequentially along the first direction F1. The second optical module 122 and the third optical module 123 each are a liquid crystal grating 23.

The first polarization direction P1 is parallel to the optical axis of the second polarizer. The alignment direction of the liquid crystal layer of the second optical module 122 is the second polarization direction P2. The alignment direction of the liquid crystal layer of the third optical module 123 is the third polarization direction P3. For the layout of the first polarization direction P1, the second polarization direction P2 and the third polarization direction P3 in this embodiment, reference can be made to any of the above embodiments.

In one embodiment, when the first optical component 121 is a spatial light modulator 21, at least two liquid crystal gratings 23 are arranged on the side of the spatial light modulator 21 where light is emitted. Along the first direction F1, the two liquid crystal gratings closest to the spatial light modulator 21 are the second optical module 122 and the third optical module 123. In this embodiment, the second polarizer 212 is adjacent to the second optical module 122 in the spatial light modulator 21, that is, at the side of the spatial light modulator 21 where light is emitted. Along the first direction F1, the two liquid crystal gratings 23 closest to the spatial light modulator 21 are the second optical module 122 and the third optical module 123.

As shown in FIG. 14 or FIG. 15, when the polarization direction of the light from the spatial light modulator 21 is different from the alignment direction of the liquid crystal layer in the adjacent liquid crystal grating 23, $\beta_3$ is set to be greater than at least one of $\beta_1$ and $\beta_2$. Therefore, the optical rotator 13 between the spatial light modulator 21 and the adjacent two liquid crystal gratings 23 rotates the polarization direction of the light by a smaller angle, and then the proportion of light waves that are incorrectly polarized is reduced, and the holographic effects can be improved.

Figure 17:
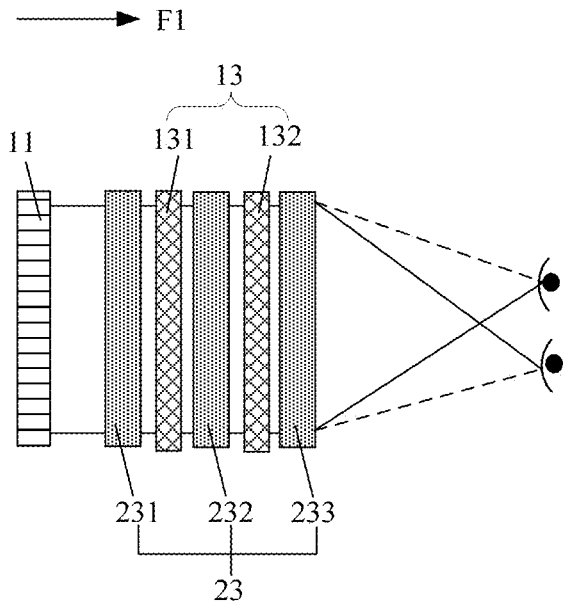
FIG. 17 is a schematic structural diagram illustrating the holographic display system according to another embodiment of the present application.

Reference is made to FIG. 17, which is a schematic structural diagram illustrating the holographic display system according to another embodiment of the present application. Combined with FIG. 3 and FIG. 17, the first optical module 121 is a first liquid crystal grating 231, the second optical module 122 is a second liquid crystal grating 232, and the third optical module 123 is a third liquid crystal grating 233. The first polarization direction P1 is the alignment direction of the liquid crystal layer in the first liquid crystal grating 231, the second polarization direction P2 is the alignment direction of the liquid crystal layer in the second liquid crystal grating 232, and the third polarization direction P3 is the alignment direction of the liquid crystal layer in the third liquid crystal grating 233.

In the embodiment shown in FIG. 17, in the construction of the holographic display system, the liquid crystal gratings 23 are arranged sequentially along the first direction F1 according to the embodiments of the present application for the purpose of $\beta_3$ is greater than at least one of $\beta_1$ and $\beta_2$ when the alignment direction of the liquid crystal layer in each liquid crystal grating 23 is known. Therefore, at least one optical rotator 13 rotates the polarization direction of the light by a small angle, and then the proportion of light waves that are correctly polarized is increased, and the holographic effects can be improved.

Figure 18:
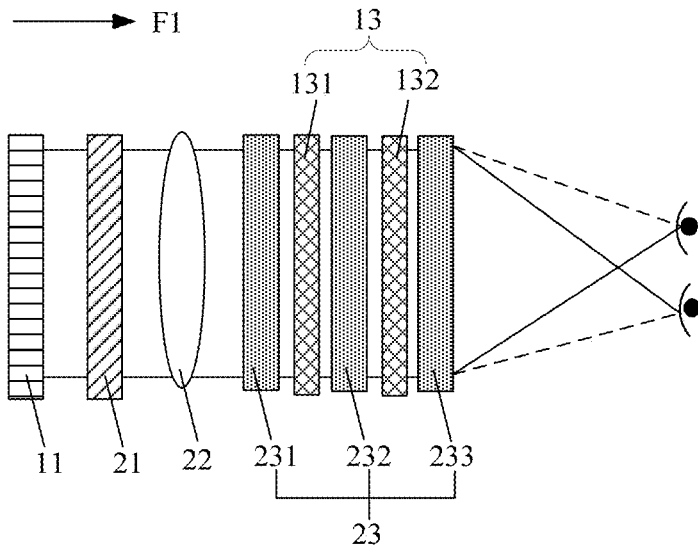
FIG. 18 is a schematic structural diagram illustrating the holographic display system according to another embodiment of the present application.

Reference is made to FIG. 18, which is a schematic structural diagram illustrating the holographic display system according to another embodiment of the present application. Similarly, the first optical module 121 is the first liquid crystal grating 231, the second optical module 122 is the second liquid crystal grating 232, and the third optical module 123 is the third liquid crystal grating 233. The first polarization direction P1 is the alignment direction of the liquid crystal layer in the first liquid crystal grating 231, the second polarization direction P2 is the alignment direction of the liquid crystal layer in the second liquid crystal grating 232, and the third polarization direction P3 is the alignment direction of the liquid crystal layer in the third liquid crystal grating 233.

Similarly, in the embodiment shown in FIG. 18, in the construction of the holographic display system, the liquid crystal gratings 23 are arranged sequentially along the first direction F1 according to the embodiments of the present application for the purpose of $\beta_3$ is greater than at least one of $\beta_1$ and $\beta_2$ when the alignment direction of the liquid crystal layer in each liquid crystal grating 23 is known. Therefore, at least one optical rotator 13 rotates the polarization direction of the light by a small angle, and then the proportion of light waves that are correctly polarized is increased, and the holographic effects can be improved.

As shown in FIG. 18, a spatial light modulator 21 is arranged between the first liquid crystal grating 231 and the backlight module 11. The polarization direction of the light from the spatial light modulator 21 is parallel to the first polarization direction P1. That is, the polarization direction of the light emitted by the spatial light modulator 21 is parallel to the alignment direction of the liquid crystal layer in the first liquid crystal grating 231. In this embodiment, the first liquid crystal grating 231 is a liquid crystal grating closest to the spatial light modulator 21. Since the polarization direction of the light from the spatial light modulator 21 is parallel to the alignment direction of the liquid crystal layer in the first liquid crystal grating 231, then the light from the spatial light modulator 21 is incident on the first liquid crystal grating 231 parallelly. The light whose polarization direction has adjusted by the first optical rotator 131 and the second optical rotator 132 is incident on the second liquid crystal grating 232 with the polarization direction being parallel to the alignment direction of the liquid crystal layer in the second liquid crystal grating 232, and incident on the third crystal grating 233 with the polarization direction being parallel to the alignment direction of the liquid crystal layer in the third crystal grating 233. Therefore, the alignment directions of the liquid crystal layers in the first liquid crystal grating 231, the second liquid crystal grating 232 and the third liquid crystal grating 233 are parallel to the polarization direction of the incident light, and the propagation direction of the light can be deflected.

In one embodiment, as shown in FIG. 18, a field lens 22 is provided between the spatial light modulator 21 and the adjacent liquid crystal grating 23. The field lens 22 is configured to improve transmission of light emitted from the spatial light modulator 21 to the adjacent liquid crystal grating 23. In other embodiments, no field lens 22 is arranged when the light from the spatial light modulator 21 is well incident on the adjacent liquid crystal grating 23.

In other embodiments, the first liquid crystal grating 231 is not closest to the spatial light modulator 21. That is, at least one another liquid crystal grating 23 is arranged between the first liquid crystal grating 231 and the spatial light modulator 21.

Figure 19:
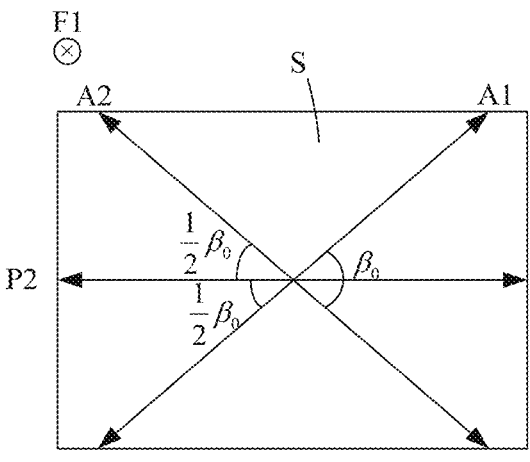
FIG. 19 is a schematic diagram illustrating a layout between a second liquid crystal grating and an adjacent optical rotator in the holographic display system in principle according to an embodiment of the present application.

Reference is made to FIG. 19, which a schematic diagram illustrating a layout between a second liquid crystal grating and an adjacent optical rotator in the holographic display system in principle according to an embodiment of the present application. Based on the above arrangement, the optical rotator 13 between the first liquid crystal grating 231 and the second liquid crystal grating 232 is the first optical rotator 131, and the optical rotator 13 between the second liquid crystal grating 232 and the third liquid crystal grating 233 is the second optical rotator 132. The optical axis A1 of the first optical axis 131 intersects with the optical axis A2 of the second optical rotator 132, and at a preset angle of $\beta_0$. The second polarization direction P2 is the angular bisector of the preset angle $\beta_0$. In the embodiment shown in FIG. 19, the second polarization direction P2 is the angular bisector of the preset angle $\beta_0$, to facilitate the layout of the second liquid crystal grating 232, the first rotator 131 and the second rotator 132.

Figure 20:
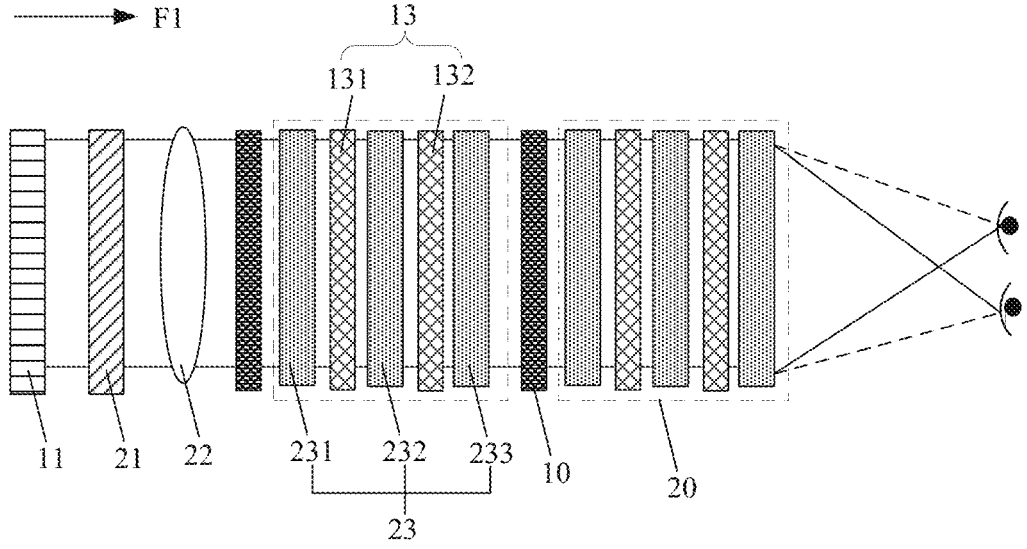
FIG. 20 is a schematic structural diagram illustrating the holographic display system according to another embodiment of the present application.

Reference is made to FIG. 20, which is a schematic structural diagram illustrating the holographic display system according to another embodiment of the present application. The holographic display system includes multiple liquid crystal grating modules 20 each including at least the first liquid crystal grating 231, the second liquid crystal grating 232 and the third liquid crystal grating 233. The side of at least one liquid crystal grating module 20 where the light is incident is provided with a dimmer device 10. The dimmer device 10 rotates the polarization direction of the incident light. Therefore, at least one liquid crystal grating module 20 changes the propagation direction of the incident light, and at least one liquid crystal grating module 20 does not change the propagation direction of the incident light.

For the holographic display system, the backlight emitted from the backlight module 11 includes a red laser, a green laser and a blue laser sequentially. If the holographic display system only deflects the propagation direction of laser by one liquid crystal grating module 20, the liquid crystal grating module 20 is provided with a higher refresh rate. In one embodiment, if both the left eye and the right eye are to perceive a first set refresh rate, the liquid crystal grating module 20 is provided with a second set refresh rate. The second set refresh rate is 6 times the first set refresh rate. This is for the reason that the liquid crystal grating module 20 forms the left and right eye images respectively. Each left eye image and each right eye image include a red sub-image, a green sub-image and a blue sub-image. The refresh rate of each sub-image is the first set refresh rate, and then the refresh rate of both the left and right eye images is 3 times the first set refresh rate. Further, the liquid crystal grating module 20 displays the left eye image and the right eye image asynchronously, and then the refresh rate of the liquid crystal grating module 20 is 6 times the first set refresh rate. In an embodiment, the left eye and the right eye are both to perceive the image of 60 Hz, the holographic display system with a single liquid crystal module 20 is provided with the refresh rate of 360 Hz, which imposes higher requirements on the refresh rate of the liquid crystal grating module 20.

In the conventional technology, the refresh rate of the liquid crystal grating module 20 is generally reduced by sacrificing the perceived frequency of the human eye. That is, the second set refresh rate is decreased by reducing the first set refresh rate, and then the refresh rate of the liquid crystal grating module 20 is reduced. However, the excessively low first set refresh rate results in flickering, resulting in poor display quality. It is found that the first set refresh rate is reduced to 40 Hz at most, and the first set refresh rate lower than 40 Hz results in severe flickering.

From the above description, it can be seen that there is a dilemma between the first set refresh rate and the second set refresh rate. If the first set refresh rate is increased, the image display quality is improved. However, the second set refresh rate is greatly increased, imposing higher requirements on the refresh rate of the liquid crystal grating module 20. If the first set refresh rate is reduced, the requirement on the refresh rate of the liquid crystal grating module 20 is lowered. However, the image display quality is poor. Therefore, a compromise is offered, and the first set refresh rate is generally set to 60 Hz.

Multiple liquid crystal grating modules 20 are arranged in the holographic display system according to the embodiments of the present application. Further, with the dimmer device 10, at least one liquid crystal grating module 20 changes the propagation direction of incident light, and at least another liquid crystal grating module 20 does not change the propagation direction of incident light. In this way, at the same moment, part of the liquid crystal grating modules 20 deflects the propagation direction of the incident light, and part of the liquid crystal grating modules 20 does not deflect the propagation direction of the incident light, to reduce the refresh rate of the liquid crystal grating module 20.

The dimmer device 10 is provided with a first working mode and a second working mode. In the first working mode, the incident light passes through the dimmer device 10 with the polarization direction remaining unchanged. In the second working mode, after the incident light pass through the dimmer device 10, the polarization direction is rotated by a set angle. By controlling the working mode of the dimmer device 10, the dimmer device 10 controls the polarization direction of the light to be parallel to the alignment direction of the liquid crystal layer in the liquid crystal grating 23, or perpendicular to the alignment direction of the liquid crystal layer in the liquid crystal grating 23.

In the embodiment shown in FIG. 20, for each liquid crystal grating module 20, a dimmer device 10 is arranged on the of the liquid crystal grating module 20 where the light is incident. The dimmer device 10 may be an electronically controlled birefringent liquid crystal device (ECB).

In the same liquid crystal grating module 20, when the polarization direction of the light is parallel to the alignment direction of the liquid crystal layer in the liquid crystal grating 23, the liquid crystal grating module 20 can change the propagation direction of the light, and the propagation direction of the light is deflected. When the polarization direction of the light is perpendicular to the alignment direction of the liquid crystal layer in the liquid crystal grating 23, the liquid crystal grating module 20 does not change the propagation direction of the light, and therefore the propagation direction of the light remains unchanged.

The holographic display system according to the embodiment of the present application includes at least one liquid crystal grating module 20. Each liquid crystal grating module includes at least three liquid crystal gratings 23. The three liquid crystal gratings 23 arranged sequentially in the liquid crystal grating module 20 serve as the first optical module 121, the second optical module 122 and the third optical module 123, respectively.

As mentioned above, the holographic display system includes at least one liquid crystal grating module 20. The liquid crystal grating module 20 includes N liquid crystal gratings 23, namely, a first liquid crystal grating to an N-th liquid crystal grating sequentially along the first direction F1. N is a positive integer not less than 3. In the same liquid crystal grating module 20, the first liquid crystal grating 231 is the (i−1)-th liquid crystal grating, the second liquid crystal grating 232 is the i-th liquid crystal grating, and the third liquid crystal grating 233 is the (i+1)-th liquid crystal grating, where $2 \leq i \leq N-1$ and i is an integer.

In case of N=3, three liquid crystal gratings 23 in the liquid crystal grating module 20 are such arranged along the first direction F1 that $\beta_3$ is greater than at least one of $\beta_1$ and $\beta_2$. Therefore, the proportion of light waves that are correctly polarized can be increased, to improve the holographic effects.

In case of N>3, the three liquid crystal gratings 23 in the liquid crystal grating module 20 are such arranged along the first direction F1 that $\beta_3$ is greater than at least one of $\beta_1$ and $\beta_2$. Therefore, the proportion of light waves that are correctly polarized can be increased, to improve the holographic effects.

Figure 21:
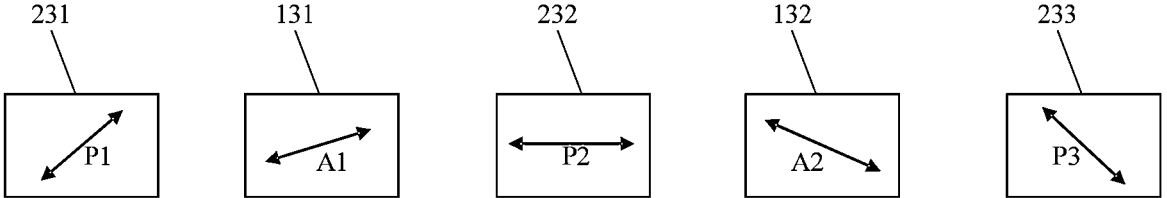
FIG. 21 is a schematic diagram illustrating the layout between a liquid crystal grating and an optical rotator in principle according to an embodiment of the present application.
Figure 22:
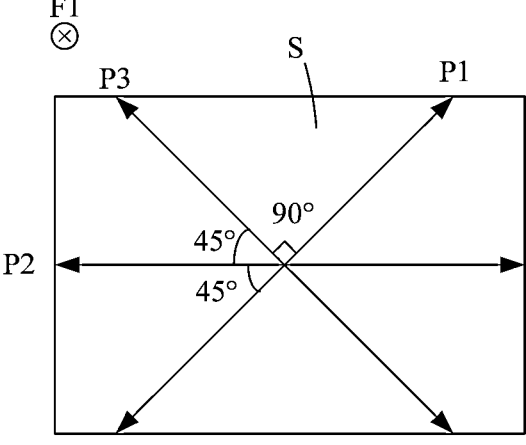
FIG. 22 is a top view of the liquid crystal grating and the optical rotator shown in FIG. 21 along a first direction.

References are made to FIG. 21 and FIG. 22. FIG. 21 is a schematic diagram illustrating the layout between a liquid crystal grating and an optical rotator in principle according to an embodiment of the present application. FIG. 22 is a top view of the liquid crystal grating and the optical rotator shown in FIG. 21 along a first direction. In FIG. 21, based on the arrangement of the devices along the first direction F1 in the holographic display system, the top view of the first liquid crystal grating 231, the first optical rotator 131, the second liquid crystal grating 232, the second optical rotator 132 and the third liquid crystal grating 233 are sequentially illustrated from left to right. The bidirectional arrow in FIG. 21 indicates the alignment direction of the liquid crystal layer in the liquid crystal grating or the optical axis in the optical rotator 13. As mentioned above, the alignment direction of the liquid crystal layer in the first liquid crystal grating 231 is parallel to the first polarization direction P1. The alignment direction of the liquid crystal layer in the second liquid crystal grating 232 is parallel to the second polarization direction P2. The alignment direction of the liquid crystal layer in the third liquid crystal grating 233 is parallel to the third polarization direction P3. The first optical rotator 131 has an optical axis A1. The second optical rotator 132 has an optical axis A2.

As shown in FIG. 21 and FIG. 22, the first polarization direction P1, the second polarization direction P2 and the third polarization direction P3 are all parallel to the reference plane S. The reference plane S is perpendicular to the first direction F1. In the reference plane S, the vertical projection of the second polarization direction P2 is at a 45° angle to the vertical projection of the first polarization direction P1, and the vertical projection of the second polarization direction P2 is at a 45° angle to the vertical projection of the third polarization direction P3.

In one embodiment, the vertical projection of the first polarization direction P1 is perpendicular to the vertical projection of the third polarization direction P3.

Figure 23:
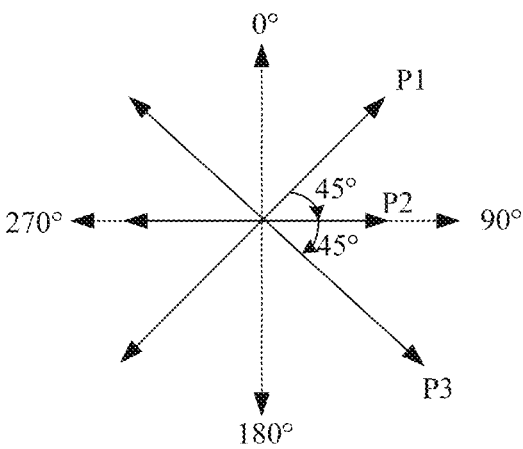
FIG. 23 is a schematic diagram illustrating the positional relationship among the alignment directions of a first liquid crystal grating, a second liquid crystal grating and a third liquid crystal grating in a reference coordinate system.

Reference is made to FIG. 23, which is a schematic diagram illustrating the positional relationship among the alignment directions of a first liquid crystal grating, a second liquid crystal grating and a third liquid crystal grating in a reference coordinate system. The coordinate system shown in FIG. 23 is defined based on the scene that the user observes the image sitting down. The reference plane S is perpendicular to the horizontal direction. In this scene, the direction from bottom to top is a 0° direction, and the opposite direction of this direction is a 180° direction. The left to right direction is a 90° direction, and the opposite direction of this direction is a 2700 direction.

In the coordinate system shown in FIG. 23, along the clockwise direction, the first polarization direction P1 is at an angle of 45°, the second polarization direction P2 is at an angle of 90°, and the third polarization direction is at an angle of 180°. The polarization direction of the light emitted by the first liquid crystal grating 231, when rotated by 45° clockwise, is parallel to the alignment direction of the liquid crystal layer in the second liquid crystal grating 232. The polarization direction of the light emitted by the second liquid crystal grating 232, when rotated by 45° clockwise, is parallel to the alignment direction of the liquid crystal layer in the third liquid crystal grating 233. In this embodiment, the alignment directions of the liquid crystal layers in the first liquid crystal gratings 231, 232 and 233 are at angles in ascending order. In other embodiments, the alignment directions of the liquid crystal layers in the first liquid crystal gratings 231, 232 and 233 are at angles in descending order.

The liquid crystal grating 23 has multiple strip-shaped electrodes arranged in parallel. The strip-shaped electrodes are generally ITO electrodes. A direction along which the strip-shaped electrode extends is generally perpendicular to the alignment direction of the liquid crystal layer in the liquid crystal grating 23. When the propagation direction of the incident light is deflected by the liquid crystal grating 23, the direction of the light is deflected. In the embodiments shown in FIG. 23, the second polarization direction P2 serves as the upright direction of the image displayed by the holographic display system, and the propagation direction of light, when passing through the second liquid crystal grating 232, is deflected to a large extent in the horizontal direction. The user, when sitting and observing the image, mainly moves the head left and right, and therefore this solution can follow the eyes well for holographic representation. In addition, the light of the first polarization direction P1 is rotated by 45° and light of the third polarization direction P3 is rotated by 135° in FIG. 23, and both have vertical and horizontal components, which can not only compensate for the deflection distance in the horizontal direction, but also control the vertical deflection.

In the embodiment of the present application, the optical rotator 13 is a half-wave plate. The polarization direction of the light from the optical module 12 is changed, and the polarization direction of the light is parallel to the corresponding polarization direction of the next optical module 12.

In other embodiments, the optical rotator 13 includes multiple half-wave plates sequentially arranged along the first direction F1. As described above, after the rotation by the half-wave plate, the light partially fails to be rotated to the desired polarization direction. The larger the rotation angle by the half-wave plate to the polarization direction of the light, the larger the proportion of light waves that are incorrectly polarized. In the embodiment, the optical rotator 13 includes multiple half-wave plates sequentially arranged along the first direction F1, and each half-wave plate in the same optical rotator 13 corresponds to a small rotation angle. Therefore, the proportion of light waves that are correctly polarized can be increased.

In other embodiments, the optical rotator 13 includes multiple half-wave plates. The number of half-wave plates in the same optical rotator 13 does not exceed 3. Although the greater the number of half-wave plates in the optical rotator 13, the rotation angle of the polarization direction of the half-wave plates is reduced to a greater extent. However, an excessive increase in the number of half-wave plates may result in the increase of the system volume. For a compromise between the system volume and the holographic effects, the number of half-wave plates in the same optical rotator 13 is greater than or equal to 3 in the embodiments of the present application.

Based on the holographic display system according to the above embodiments, an electronic device is provided in another embodiment of the present application. The electronic device is as shown in FIG. 24.

Figure 24:
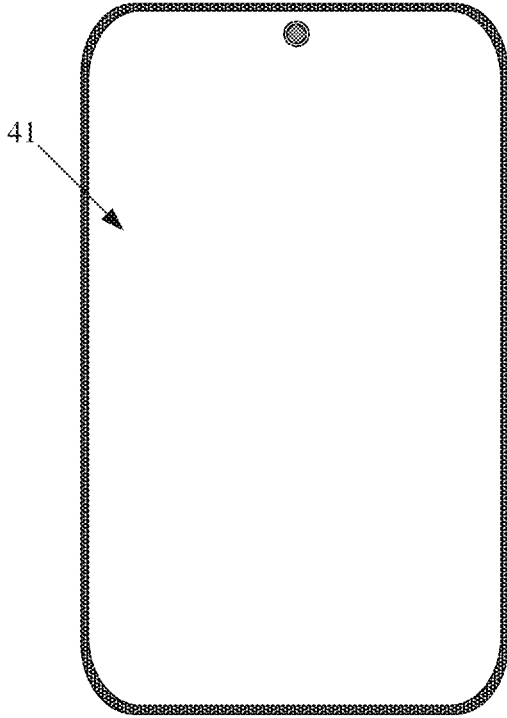
FIG. 24 is a schematic structural diagram illustrating an electronic device according to an embodiment of the present application.

Reference is made to FIG. 24, which is a schematic structural diagram illustrating an electronic device according to an embodiment of the present application. The electronic device 41 includes the holographic display system according to any of the above embodiments.

The electronic device may be a mobile phone, a computer, a wearable device, a television, a car display device and other electronic product with display functions. The electronic device includes the holographic display system according to any of the above embodiments. Therefore, the proportion of light waves that are correctly polarized emitted by the optical rotator 13 can be increased, and then the holographic effects can be improved.

The above embodiments are described in progressively, or in parallel, or both progressively and in parallel. Each of the embodiments mainly focuses on describing its differences from other embodiments, and reference may be made among these embodiments with respect to the same or similar parts.

In the description of the present disclosure, it should be understood that the drawings and the description of the specific embodiments are illustrative rather than restrictive. The same drawing numerals are used to identify the same structures throughout the embodiments of the present specification. Additionally, the thickness of a layer, a film, a panel, an area may be enlarged in the drawings for ease of understanding and description. It should be understood that, when an element such as a layer, a film, an area or a substrate is referred to as being "on" another element, the element may be directly or indirectly on another element. In addition, the term "on" indicates to position an element on or below another element, and does not essentially indicate to position an element on top of another element in a direction of gravity.

The orientation or positional relationship indicated by the terms "upper", "lower", "top", "bottom", "inner", and "outer" etc., is based on the orientation or positional relationship shown in the drawings, and is merely for the convenience of describing the present disclosure or simplifying the description, and does not indicate or imply that the device or element referred to must have a specific orientation or be constructed or operated in a specific orientation, and therefore cannot be understood as a limitation of the present disclosure. When a component is considered to be "connected" to another component, the component may be connected to another component directly or an intermediate element is configured.

It should be further illustrated that a relation term such as "first" and "second" herein is only used to distinguish one entity or operation from another entity or operation, and does not necessarily require or imply that there is an actual relation or sequence between these entities or operations. Furthermore, terms such as "include", "comprise" or any other variations thereof are intended to be non-exclusive. Therefore, an article or device including a series of elements includes not only the elements but also other elements that are not enumerated, or further includes the elements inherent for the article or device. Unless expressively limited, the statement "including a . . . " does not exclude the case that other similar elements may exist in the article or the device other than enumerated elements.

What is claimed is:

1. A holographic display system, comprising:
   a backlight module configured to emit backlight;
   a plurality of optical modules arranged at a side of the backlight module where the backlight is to be emitted, wherein the plurality of optical modules comprise at least a first optical module, a second optical module and a third optical module arranged sequentially in a first direction towards which the backlight is to be emitted, the first optical module is configured to transmit light of a first polarization direction, the second optical module is configured to transmit light of a second polarization direction, and the third optical module is configured to transmit light of a third polarization direction, the first polarization direction, the second polarization direction, and the third polarization direction are not parallel to each other, wherein the first polarization direction, the second polarization direction and the third polarization direction are all parallel to a reference plane, and the reference plane is perpendicular to the first direction; at least two of the first optical module, the second optical module and the third optical module are liquid crystal grating; and
   optical rotators configured to shift the polarization direction, wherein the first optical module, a first one of the optical rotators, the second optical module, a second one of the optical rotators and the third optical module are arranged in sequence in the first direction, the first polarization direction and the second polarization direction are at an angle of $\beta_1$, the second polarization direction and the third polarization direction are at an angle of $\beta_2$, and the first polarization direction and the third polarization direction are at an angle of $\beta_3$, wherein $\beta_3$ is greater than at least one of $\beta_1$ and $\beta_2$.

2. The holographic display system according to claim 1, wherein the first optical module is a spatial light modulator comprising a first polarizer, a liquid crystal light valve and a second polarizer arranged sequentially along the first direction; and the second optical module and the third optical module each are the liquid crystal grating, wherein the first polarization direction is parallel to an optical axis of the second polarizer; the second polarization direction is an alignment direction of a liquid crystal layer in the liquid crystal grating serving as the second optical module; and the third polarization direction is an alignment direction of a liquid crystal layer in the liquid crystal grating serving as the third optical module.

3. The holographic display system according to claim 1, wherein $$(\beta_3 - \beta_1)(\beta_3 - \beta_2) > 0.$$

4. The holographic display system according to claim 3, wherein $$\beta_1 = \beta_2 \text{ and/or } \beta_3 = \beta_1 + \beta_2.$$

5. The holographic display system according to claim 4, wherein $$\beta_3 = 90°.$$

6. The holographic display system according to claim 1, wherein $$(\beta_3 - \beta_1)(\beta_3 - \beta_2) < 0.$$

7. The holographic display system according to claim 6, wherein $$\beta_2 = \beta_1 + \beta_3; \text{ or}$$
$$\beta_1 = \beta_3 + \beta_2.$$

8. The holographic display system according to claim 1, wherein $$(\beta_3 - \beta_1)(\beta_3 - \beta_2) = 0.$$

9. The holographic display system according to claim 1, wherein the first optical module is a first liquid crystal grating, the second optical module is a second liquid crystal grating, and the third optical module is a third liquid crystal grating; and the first polarization direction is an alignment direction of a liquid crystal layer in the first liquid crystal grating, the second polarization direction is an alignment direction of a liquid crystal layer in the second liquid crystal grating, and the third polarization direction is an alignment direction of a liquid crystal layer in the third liquid crystal grating.

10. The holographic display system according to claim 9, wherein a spatial light modulator is arranged between the first liquid crystal grating and the backlight module, and configured to emit light of a polarization direction parallel to the first polarization direction.

11. The holographic display system according to claim 9, wherein an optical rotator between the first liquid crystal grating and the second liquid crystal grating is a first optical rotator, and the optical rotator between the second liquid crystal grating and the third liquid crystal grating is a second optical rotator, wherein an optical axis of the first optical rotator intersects with an optical axis of the second optical rotator and is at a preset angle to the optical axis of the second optical rotator, and the second polarization direction coincides with an angle bisector of the preset angle.

12. The holographic display system according to claim 9, comprising:

a plurality of liquid crystal grating modules, wherein the liquid crystal grating modules each comprise at least the first liquid crystal grating, the second liquid crystal grating and the third liquid crystal grating; and a dimmer device at a side of at least one of the plurality of liquid crystal grating modules where light is incident and configured to change the polarization direction of the incident light for at least one of the plurality of liquid crystal grating modules to change a direction in which the incident light is to propagate and at least another of the plurality of liquid crystal grating modules to maintain the direction in which the incident light is to propagate.

13. The holographic display system according to claim 9, comprising: at least one liquid crystal grating module, wherein the liquid crystal grating module comprises 1st liquid crystal grating to an N-th liquid crystal grating arranged sequentially in the first direction, and N is a positive integer greater than or equal to 3; and in the same liquid crystal grating module, the first liquid crystal grating is an (i−1)-th liquid crystal grating, the second liquid crystal grating is an i-th liquid crystal grating, and the third liquid crystal grating is an (i+1)-th liquid crystal grating, wherein i is an integer and $2 \le i \le N-1$.

14. The holographic display system according to claim 9, wherein a vertical projection of the second polarization direction in the reference plane is at an angle of 45° to a vertical projection of the first polarization direction in the reference plane, and the vertical projection of the second polarization direction in the reference plane is at an angle of 45° to the vertical projection of the third polarization direction in the reference plane.

15. The holographic display system according to claim 1, wherein an optical rotator is a half-wave plate.

16. The holographic display system according to claim 1, wherein an optical rotator comprises a plurality of half-wave plates arranged sequentially in the first direction.

17. The holographic display system according to claim 16, wherein the number of the half-wave plates is less than or equal to three in the same optical rotator.

18. The holographic display system according to claim 1, wherein $\beta_1$ and $\beta_2$ each are less than 50°.

19. The holographic display system according to claim 1, wherein the backlight comprises a red laser, a green laser and a blue laser emitted sequentially;

one of the optical rotators is configured to delay both a phase of an ordinary wave and a phase of an extraordinary wave in the green laser by half a wave.

20. An electronic device, comprising: a holographic display system, wherein the holographic display system comprises:

a backlight module configured to emit backlight;

a plurality of optical modules arranged at a side of the backlight module where the backlight is to be emitted, wherein the plurality of optical modules comprise at least a first optical module, a second optical module and a third optical module arranged sequentially in a first direction towards which the backlight is to be emitted, the first optical module is configured to transmit light of a first polarization direction, the second optical module is configured to transmit light of a second polarization direction, and the third optical module is configured to transmit light of a third polarization direction, the first polarization direction, the second polarization direction, and the third polarization direction are not parallel to each other, wherein the first polarization direction, the second polarization direction and the third polarization direction are all parallel to a reference plane, and the reference plane is perpendicular to the first direction; and optical rotators configured to shift the polarization direction, wherein the first optical module, a first one of the optical rotators, the second optical module, a second one of the optical rotators and the third optical module are arranged in sequence in the first direction, the first polarization direction and the second polarization direction are at an angle of $\beta_1$, the second polarization direction and the third polarization direction are at an angle of $\beta_2$, and the first polarization direction and the third polarization direction are at an angle of $\beta_3$, wherein $\beta_3$ is greater than at least one of $\beta_1$ and $\beta_2$.

* * * * *